Feb. 3, 1942.  R. C. WALLACE  2,271,849
DRIVEN STEERING WHEEL UNIT
Filed Sept. 21, 1940
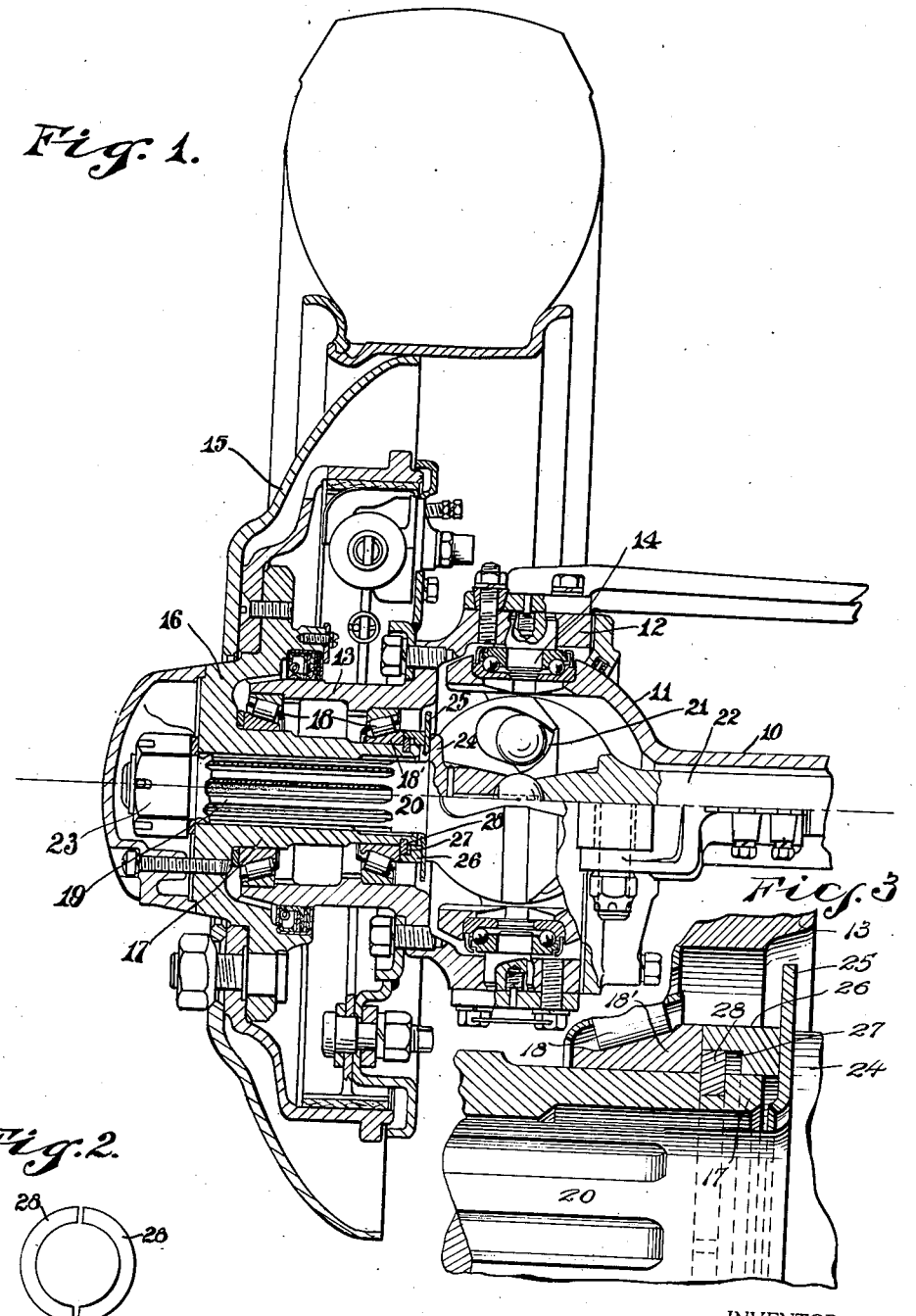
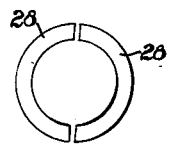
INVENTOR.
Robert C. Wallace,
BY
Hood & Hahn
ATTORNEYS Patented Feb. 3, 1942

2,271,849

UNITED STATES PATENT OFFICE 2,271,849

DRIVEN STEERING WHEEL UNIT

Robert C. Wallace, Indianapolis, Ind., assignor to Marmon-Herrington Company, Inc., Indianapolis, Ind., a corporation of Indiana Application September 21, 1940, Serial No. 357,673

3 Claims. (Cl. 301—126)

The object of my invention is to provide a driven steering wheel structure of such character that its supporting bearings may be adjusted by means of a readily accessible adjusting nut, yet of such construction that, in case of breakage of any part of the driving shaft, the wheel will remain upon its swinging bearing sleeve.

The accompanying drawing illustrates my invention.

Fig. 1 is a vertical axial section;

Fig. 2 is a side elevation of the retaining element; and

Fig. 3 is a fragmentary section on the plane of Fig. 1 on an enlarged scale.

In the drawing 10 indicates the shell of the main portion of the axle provided, at its outer end, with a ball shaped housing 11 over which is sleeved the cup 12 of the wheel bearing sleeve 13, the part 12—13 being pivotally associated with the part 11, to swing about a substantially vertical axis, by suitable trunnion bearings 14. The wheel 15 is composed, in part, of a hub element 16 having an axial sleeve 17 which is projected into sleeve 13 and supported therein by bearings 18—18. The bore of sleeve 17 is splined to receive the splines 19 of shaft 20 which is the outer element of a universal-velocity joint 21 which connects the inner end of shaft 20 and the outer end of shaft 22 which is mounted in the casing 10 and connected at its inner end to a differential (not shown).

The outer end of shaft 20 is threaded to receive the adjusting nut 23 which engages hub 16. Shaft 20 carries an annular collar 24 which engages a washer 25. The inner race 18' of the inner bearing 18 is sleeved upon the inner end of sleeve 17 and interposed between this inner race and washer 25 is a ring 26 which is sleeved upon the inner end of sleeve 17. Ring 26, at its outer end, is provided with a counterbored notch 27 adapted to receive a locking ring 28 seated in an annular notch in the outer surface of sleeve 17 near its inner end, said locking ring overlying the inner end of race 18'. Notch 27 has an axial extent enough greater than the axial dimension of locking ring 28 to equal or slightly exceed the amount of axial adjustment of race 18' sufficient to compensate the maximum wear of bearing 18.

It will be noted that if nut 23 be entirely removed from the outer end of shaft 20, the wheel 15 will, nevertheless, be axially retained on sleeve 13 so long as locking ring 28 remains in place and that this locking ring can only be withdrawn by first separating the trunnion connection between parts 11 and 12 and then withdrawing shaft 20 toward the right, Fig. 1.

As a result of this construction, necessary adjustments of the bearings 18 may, at all times, be readily accomplished by adjustment of nut 23; yet, if, for any reason, there should be a breakage of either shaft 20 or shaft 22 the wheel would not come off of sleeve 13 and consequently all danger of the wheel being thrown from its bearings, as a result of breakage of the driving shaft, is eliminated.

The locking ring 28 may be merely a one-piece split ring to be sprung into its notch in sleeve 17, but I prefer to make this locking ring of two nearly semi-annular parts, as shown in Fig. 2, the notch 27 in ring 26 serving to retain these two parts in the notch in sleeve 17 so long as the several parts remain in their normal positions.

I claim as my invention:

1. In a vehicle, an axle element, a wheel hub, bearings interposed between said axle element and wheel hub of such character that axial movement of the wheel hub relative to the axle element will effect radial adjustment of said bearings, a rotatable shaft within the axle element and non-rotatively associated with the wheel hub to cause rotation thereof and projected through said hub, a hub-engaging element on the outer end of said shaft and axially adjustable thereon, and means other than the aforesaid hub-engaging element limiting outward withdrawal of the hub from the axle element.

2. In a vehicle, an axle element, a wheel hub, bearings interposed between said axle element and wheel hub of such character that axial movement of the wheel hub relative to the axle element will effect radial adjustment of said bearings, a rotatable shaft within the axle element and non-rotatively associated with the wheel hub to cause rotation thereof and projected through said hub, a hub-engaging element on the outer end of said shaft and axially adjustable thereon, and a removable retainer attached to the inner end of the wheel hub and engaging the adjacent bearing to limit outward axial movement of said hub.

3. In a vehicle, an axle element, a wheel hub, bearings interposed between said axle element and wheel hub of such character that axial movement of the wheel hub relative to the axle element will effect radial adjustment of said bearings, a rotatable shaft within the axle element and non-rotatively associated with the wheel hub to cause rotation thereof and projected through said hub, a hub-engaging element on the outer end of said shaft and axially adjustable thereon, a split ring seated in the inner end of the wheel hub and radially overlying the adjacent bearing, and a ring radially overlying said split ring interposed between said bearing and an outwardly presented shoulder carried by the shaft, said overlying ring, split ring, and inner end of the wheel hub being so associated that the inner end of the wheel hub has a limited freedom of axial movement relative to said overlying ring.

ROBERT C. WALLACE.